United States Patent
Liu et al.

(10) Patent No.: US 10,310,971 B2
(45) Date of Patent: Jun. 4, 2019

(54) METHOD AND APPARATUS FOR PROCESSING MEMORY PAGE IN MEMORY

(71) Applicant: Huawei Technologies Co., Ltd., Shenzhen (CN)

(72) Inventors: Duo Liu, Chongqing (CN); Zili Shao, Chongqing (CN); Linbo Long, Chongqing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 15/651,862

(22) Filed: Jul. 17, 2017

(65) Prior Publication Data

US 2017/0315931 A1    Nov. 2, 2017

Related U.S. Application Data

(63) Continuation of application No. PCT/CN2015/090765, filed on Sep. 25, 2015.

(30) Foreign Application Priority Data

Jan. 15, 2015  (CN) .......................... 2015 1 0021433

(51) Int. Cl.
*G06F 12/02* (2006.01)
*G06F 12/122* (2016.01)

(52) U.S. Cl.
CPC .......... *G06F 12/0246* (2013.01); *G06F 12/02* (2013.01); *G06F 12/023* (2013.01);
(Continued)

(58) Field of Classification Search
CPC ......... G06F 11/1072; G06F 2212/7205; G06F 12/0253; G06F 2212/7201;
(Continued)

(56) References Cited

U.S. PATENT DOCUMENTS

2008/0215800 A1   9/2008  Lee et al.
2009/0327586 A1  12/2009  Kuo
(Continued)

FOREIGN PATENT DOCUMENTS

CN    101937710 A    1/2011
CN    102346682 A    2/2012
(Continued)

OTHER PUBLICATIONS

Machine Translation and Abstract of Chinese Publication No. CN102346682, Feb. 8, 2012, 18 pages.
(Continued)

*Primary Examiner* — Reginald G Bragdon
*Assistant Examiner* — Thanh D Vo
(74) *Attorney, Agent, or Firm* — Conley Rose, P.C.

(57) ABSTRACT

A method for processing a memory page in memory, where the memory page in the memory includes an idle single-level cell (SLC) memory page, an active SLC memory page, an inactive SLC memory page, and a multi-level cell (MLC) memory page, and when a quantity of idle SLC memory pages of any virtual machine (VM) is less than a specified threshold, the processing method includes converting one idle SLC memory page to two MLC memory pages, copying data in two inactive SLC memory pages to the two converted MLC memory pages, and releasing storage space of the two inactive SLC memory pages to obtain two idle SLC memory pages.

22 Claims, 6 Drawing Sheets

(52) U.S. Cl.
CPC ........ G06F 12/0253 (2013.01); G06F 12/122 (2013.01); *G06F 2212/1036* (2013.01); *G06F 2212/251* (2013.01); *G06F 2212/7208* (2013.01)

(58) Field of Classification Search
CPC ..... G06F 2212/1036; G06F 2212/1044; G06F 2212/7211; G06F 3/0616; G06F 3/0617; G06F 3/064; G06F 12/0246
See application file for complete search history.

(56) References Cited

U.S. PATENT DOCUMENTS

| | | | |
|---|---|---|---|
| 2010/0332922 | A1 | 12/2010 | Chang et al. |
| 2012/0030405 | A1 | 2/2012 | Kunimatsu et al. |
| 2012/0297121 | A1 | 11/2012 | Gorobets et al. |
| 2012/0297122 | A1 | 11/2012 | Gorobets et al. |
| 2013/0024609 | A1* | 1/2013 | Gorobets ............ G06F 12/0246 711/103 |
| 2013/0254458 | A1 | 9/2013 | Pittelko |
| 2014/0003142 | A1 | 1/2014 | Lee et al. |
| 2014/0281158 | A1* | 9/2014 | Ravimohan ......... G06F 12/0246 711/103 |
| 2014/0293692 | A1* | 10/2014 | Chen ..................... G11C 16/06 365/185.11 |
| 2014/0379968 | A1 | 12/2014 | Yao et al. |

FOREIGN PATENT DOCUMENTS

| | | |
|---|---|---|
| CN | 102419735 A | 4/2012 |
| CN | 102591748 A | 7/2012 |
| CN | 103688246 A | 3/2014 |
| CN | 103914410 A | 7/2014 |
| CN | 103942151 A | 7/2014 |
| WO | 2012158514 A1 | 11/2012 |
| WO | 2012174216 A2 | 12/2012 |

OTHER PUBLICATIONS

Machine Translation and Abstract of Chinese Publication No. CN102591748, Jul. 18, 2012, 12 pages.
Machine Translation and Abstract of Chinese Publication No. CN103942151, Jul. 23, 2014, 24 pages.
Foreign Communication From a Counterpart Application, Chinese Application No. 201510021433.X, Chinese Office Action dated Apr. 28, 2018, 8 pages.
Machine Translation and Abstract of Chinese Publication No. CN103914410, Jul. 9, 2014, 14 pages.
Zhou, R., et al., "Leveraging Phase Change Memory to Achieve Efficient Virtual Machine Execution," in VEE, Mar. 16-17, 2013, pp. 179-190.
Qureshi, M., et al., "Morphable Memory System: A Robust Architecture for Exploiting Multi-Level Phase Change Memories," in ISCA, Jun. 19-23, 2010, pp. 153-162.
Foreign Communication From a Counterpart Application, PCT Application No. PCT/CN2015/090765, English Translation of International Search Report dated Dec. 1, 2015, 2 pages.
Foreign Communication From a Counterpart Application, PCT Application No. PCT/CN2015/090765, English Translation of Written Opinion dated Dec. 1, 2015, 4 pages.
Foreign Communication From a Counterpart Application, European Application No. 15877626.0, European Search Report dated Nov. 20, 2017, 9 pages.

* cited by examiner

METHOD AND APPARATUS FOR PROCESSING MEMORY PAGE IN MEMORY

CROSS-REFERENCE TO RELATED APPLICATIONS

This application is a continuation of International Patent Application No. PCT/CN2015/090765 filed on Sep. 25, 2015, which claims priority to Chinese Patent Application No. 201510021433.X filed on Jan. 15, 2015. The disclosures of the aforementioned applications are hereby incorporated by reference in their entireties.

TECHNICAL FIELD

The present disclosure relates to the field of storage technologies, and in particular, to a method and an apparatus for processing a memory page in memory.

BACKGROUND

With development of virtualization technologies, requirements for hardware resources such as memory resources are increasingly high. For a conventional dynamic random access memory (DRAM), energy consumption is high and capacity expansion is difficult. A new-type memory with low energy consumption, a large capacity, and non-volatility, such as a phase change memory (PCM), may be expected to replace the conventional DRAM memory.

As a new generation non-volatile memory, a PCM uses reversible phase change of a material to store information to achieve single-level cell (SLC) storage and multi-level cell (MLC) storage. An SLC features high costs, a small capacity, and a high speed, while an MLC features a large capacity, low costs, and a low speed.

Based on different features of the SLC and the MLC, if SLC storage is used, relatively high access performance may be obtained but a storage capacity may be restricted, and if MLC storage is used, a relatively large storage capacity may be obtained but access performance may be relatively low. If a manner in which the SLC and the MLC are both set in memory is used, the SLC and the MLC may be set according to a preset proportion just in accordance with requirements of access performance and a storage capacity, but relatively optimal access performance and a relatively large storage capacity cannot be obtained. That is, there is still no effective solution that takes into account advantages of both the SLC and the MLC.

SUMMARY

Embodiments of the present disclosure provide a method and an apparatus for processing a memory page in memory, to take into account both access performance and a storage capacity, and obtain better access performance and a relatively large storage capacity.

According to a first aspect, a method for processing a memory page in memory is provided, where the memory page in the memory includes an idle SLC memory page, an active SLC memory page, an inactive SLC memory page, and an MLC memory page, where the idle SLC memory page has no data, data stored in the active SLC memory page is data accessed within a specified time period, and data stored in the inactive SLC memory page and the MLC memory page is data not accessed within the specified time period, and the processing method includes converting one idle SLC memory page to two MLC memory pages when determining that a quantity of idle SLC memory pages in any virtual machine (VM) is less than a specified threshold, copying data in two inactive SLC memory pages to the two converted MLC memory pages, and releasing storage space of the two inactive SLC memory pages to obtain two idle SLC memory pages.

With reference to the first aspect, in a first possible implementation manner, a higher memory access frequency or higher memory usage indicates a shorter specified time period, or a higher memory access frequency and higher memory usage indicate a shorter specified time period.

With reference to the first aspect or the first possible implementation manner of the first aspect, in a second possible implementation manner, a smaller specified threshold indicates higher memory access performance and a higher probability of generating a page fault.

With reference to the first aspect or the first or the second possible implementation manner of the first aspect, in a third possible implementation manner, after determining that a quantity of idle SLC memory pages in any VM is less than a specified threshold, if a quantity of current inactive SLC memory pages is less than 2, the method further includes writing data in the two MLC memory pages back to an external storage, and converting the two MLC memory pages to one idle SLC memory page.

With reference to the third possible implementation manner of the first aspect, in a fourth possible implementation manner, after determining that a quantity of idle SLC memory pages in any VM is less than a specified threshold, the method further includes obtaining an idle memory page of another VM for the any VM if a quantity of current inactive SLC memory pages is less than 2 and a quantity of current MLC memory pages is less than 2.

With reference to any one of the first aspect or the first to the fourth possible implementation manners of the first aspect, in a fifth possible implementation manner, the method further includes allocating an idle SLC memory page for a memory allocation request after the memory allocation request is received, and re-identifying the idle SLC memory page as an active SLC memory page.

With reference to the fifth possible implementation manner of the first aspect, in a sixth possible implementation manner, re-identifying the idle SLC memory page as an active SLC memory page includes transferring an address of the idle SLC memory page from an established idle SLC memory page linked list to an established active SLC memory page linked list.

With reference to any one of the first aspect or the first to the sixth possible implementation manners of the first aspect, in a seventh possible implementation manner, the method further includes re-identifying an inactive SLC memory page as an active SLC memory page after an access request for the inactive SLC memory page is received.

With reference to the seventh possible implementation manner of the first aspect, in an eighth possible implementation manner, re-identifying an inactive SLC memory page as an active SLC memory page includes transferring an address of the inactive SLC memory page from an established inactive SLC memory page linked list to the established active SLC memory page linked list.

With reference to any one of the first aspect or the first to the eighth possible implementation manners of the first aspect, in a ninth possible implementation manner, the method further includes re-identifying the active SLC memory page as an inactive SLC memory page for an active SLC memory page, if no access request for the memory page is received within the specified time period.

With reference to the ninth possible implementation manner of the first aspect, in a tenth possible implementation manner, re-identifying the active SLC memory page as an inactive SLC memory page includes transferring an address of the active SLC memory page from the established active SLC memory page linked list to an established inactive SLC memory page linked list.

According to a second aspect, an apparatus for processing a memory page in memory is provided, where the memory page in the memory includes an idle SLC memory page, an active SLC memory page, an inactive SLC memory page, and an MLC memory page, where the idle SLC memory page has no data, data stored in the active SLC memory page is data accessed within a specified time period, and data stored in the inactive SLC memory page and the MLC memory page is data not accessed within the specified time period, and the apparatus includes a conversion module configured to convert one idle SLC memory page to two MLC memory pages when determining that a quantity of idle SLC memory pages in any VM is less than a specified threshold, a copy module configured to copy data in two inactive SLC memory pages to the two converted MLC memory pages, and a release module configured to release storage space of the two inactive SLC memory pages to obtain two idle SLC memory pages.

With reference to the second aspect, in a first possible implementation manner, a higher memory access frequency or higher memory usage indicates a shorter specified time period, or a higher memory access frequency and higher memory usage indicate a shorter specified time period.

With reference to the second aspect or the first possible implementation manner of the second aspect, in a second possible implementation manner, a smaller specified threshold indicates higher memory access performance and a higher probability of generating a page fault.

With reference to the second aspect or the first or the second possible implementation manner of the second aspect, in a third possible implementation manner, after determining that a quantity of idle SLC memory pages in any VM is less than the specified threshold, if a quantity of current inactive SLC memory pages is less than 2, the conversion module is further configured to write data in the two MLC memory pages back to an external storage, and convert the two MLC memory pages to one idle SLC memory page.

With reference to the third possible implementation manner of the second aspect, in a fourth possible implementation manner, after determining that a quantity of idle SLC memory pages in any VM is less than the specified threshold, if a quantity of current inactive SLC memory pages is less than 2 and a quantity of current MLC memory pages is less than 2, the conversion module is further configured to obtain an idle memory page of another VM for the any VM.

With reference to any one of the second aspect or the first to the fourth possible implementation manners of the second aspect, in a fifth possible implementation manner, the apparatus further includes a first allocation module configured to allocate an idle SLC memory page for a memory allocation request after the memory allocation request is received, and re-identify the idle SLC memory page as an active SLC memory page.

With reference to the fifth possible implementation manner of the second aspect, in a sixth possible implementation manner, the first allocation module is further configured to transfer an address of the idle SLC memory page from an established idle SLC memory page linked list to an established active SLC memory page linked list.

With reference to any one of the second aspect or the first to the sixth possible implementation manners of the second aspect, in a seventh possible implementation manner, the apparatus further includes a second allocation module configured to re-identify an inactive SLC memory page as an active SLC memory page after an access request for the inactive SLC memory page is received.

With reference to the seventh possible implementation manner of the second aspect, in an eighth possible implementation manner, the second allocation module is further configured to transfer an address of the inactive SLC memory page from an established inactive SLC memory page linked list to the established active SLC memory page linked list.

With reference to any one of the second aspect or the first to the eighth possible implementation manners of the second aspect, in a ninth possible implementation manner, the apparatus further includes a third allocation module configured to, for an active SLC memory page, if no access request for the memory page is received within the specified time period, re-identify the active SLC memory page as an inactive SLC memory page.

With reference to the ninth possible implementation manner of the second aspect, in a tenth possible implementation manner, the third allocation module is further configured to transfer an address of the active SLC memory page from the established active SLC memory page linked list to an established inactive SLC memory page linked list.

According to a third aspect, a device for processing a memory page in memory is provided, where the device includes a processor, a storage, and a bus, where the storage includes memory, a memory page in the memory includes an idle SLC memory page, an active SLC memory page, an inactive SLC memory page, and an MLC memory page, the idle SLC memory page has no data, data stored in the active SLC memory page is data accessed within a specified time period, and data stored in the inactive SLC memory page and the MLC memory page is data not accessed within the specified time period, the storage stores execution instructions, and when the device is running, the processor communicates with the storage using the bus such that the processor performs the execution instructions of converting one idle SLC memory page to two MLC memory pages when determining that a quantity of idle SLC memory pages in any VM is less than a specified threshold, copying data in two inactive SLC memory pages to the two converted MLC memory pages, and releasing storage space of the two inactive SLC memory pages to obtain two idle SLC memory pages.

With reference to the third aspect, in a first possible implementation manner, a higher memory access frequency or higher memory usage indicates a shorter specified time period, or a higher memory access frequency and higher memory usage indicate a shorter specified time period.

With reference to the third aspect or the first possible implementation manner of the third aspect, in a second possible implementation manner, a smaller specified threshold indicates higher memory access performance and a higher probability of generating a page fault.

With reference to the third aspect or the first or the second possible implementation manner of the third aspect, in a third possible implementation manner, after determining that a quantity of idle SLC memory pages in any VM is less than a specified threshold, if a quantity of current inactive SLC memory pages is less than 2, the execution instructions performed by the processor further include writing data in the two MLC memory pages back to an external storage, and converting the two MLC memory pages to one idle SLC memory page, where M is a positive integer.

With reference to the third possible implementation manner of the third aspect, in a fourth possible implementation manner, after determining that a quantity of idle SLC memory pages in any VM is less than a specified threshold, the execution instructions performed by the processor further include obtaining a memory resource of another VM for the any VM if a quantity of current inactive SLC memory pages is less than 2 and a quantity of current MLC memory pages is less than 2.

With reference to any one of the third aspect or the first to the fourth possible implementation manners of the third aspect, in a fifth possible implementation manner, the execution instructions performed by the processor further include allocating an idle SLC memory page for a memory allocation request after the memory allocation request is received, and re-identifying the idle SLC memory page as an active SLC memory page.

With reference to the fifth possible implementation manner of the third aspect, in a sixth possible implementation manner, in the execution instructions performed by the processor, re-identifying the idle SLC memory page as an active SLC memory page includes transferring an address of the idle SLC memory page from an established idle SLC memory page linked list to an established active SLC memory page linked list.

With reference to any one of the third aspect or the first to the sixth possible implementation manners of the third aspect, in a seventh possible implementation manner, the execution instructions performed by the processor further include re-identifying an inactive SLC memory page as an active SLC memory page after an access request for the inactive SLC memory page is received.

With reference to the seventh possible implementation manner of the third aspect, in an eighth possible implementation manner, in the execution instructions performed by the processor, re-identifying an inactive SLC memory page as an active SLC memory page includes transferring an address of the inactive SLC memory page from an established inactive SLC memory page linked list to the established active SLC memory page linked list.

With reference to any one of the third aspect or the first to the eighth possible implementation manners of the third aspect, in a ninth possible implementation manner, for an active SLC memory page, if no access request for the memory page is received within the specified time period, the execution instructions performed by the processor further include re-identifying the active SLC memory page as an inactive SLC memory page.

With reference to the ninth possible implementation manner of the third aspect, in a tenth possible implementation manner, in the execution instructions performed by the processor, re-identifying the active SLC memory page as an inactive SLC memory page includes transferring an address of the active SLC memory page from the established active SLC memory page linked list to an established inactive SLC memory page linked list.

In the foregoing solutions, an idle memory page and an active memory page exist in a form of an SLC, and these memory pages are memory pages that may be accessed within a short time. Use of high-performance SLC storage mode for these memory pages can fully improve access performance. In addition, to take into account a storage capacity, when a quantity of available idle SLC memory pages in a VM is less than a specified threshold, data in an inactive SLC memory page is converted to data in an MLC memory page for storage. Because a storage capacity of an MLC is twice that of an SLC, after data in two inactive SLC memory pages is converted to data in two MLC memory pages for storage, one idle SLC memory page may further be saved (one idle SLC memory page is converted to two MLC memory pages, and data in two inactive SLC memory pages is transferred to the two converted MLC memory pages to obtain two idle SLC memory pages. That is, one idle SLC memory page is saved), thereby improving the storage capacity and reducing page faults.

DESCRIPTION OF EMBODIMENTS

In the embodiments of the present disclosure, an idle memory page and an active memory page exist in a form of an SLC, and these memory pages are memory pages that may be accessed within a short time. Use of high-performance SLC storage mode for these memory pages can fully improve access performance. In addition, to take into account a storage capacity, when a quantity of available idle SLC memory pages in a VM is less than a specified threshold, data in an inactive SLC memory page is converted to data in an MLC memory page for storage. Because a storage capacity of an MLC is twice that of an SLC, after data in two inactive SLC memory pages is converted to data in two MLC memory pages for storage, one idle SLC memory page may further be saved (one idle SLC memory page is converted to two MLC memory pages, and data in two inactive SLC memory pages is transferred to the two converted MLC memory pages, to obtain two idle SLC memory pages. That is, one idle SLC memory page is saved), thereby improving the storage capacity and reducing page faults.

Figure 1:
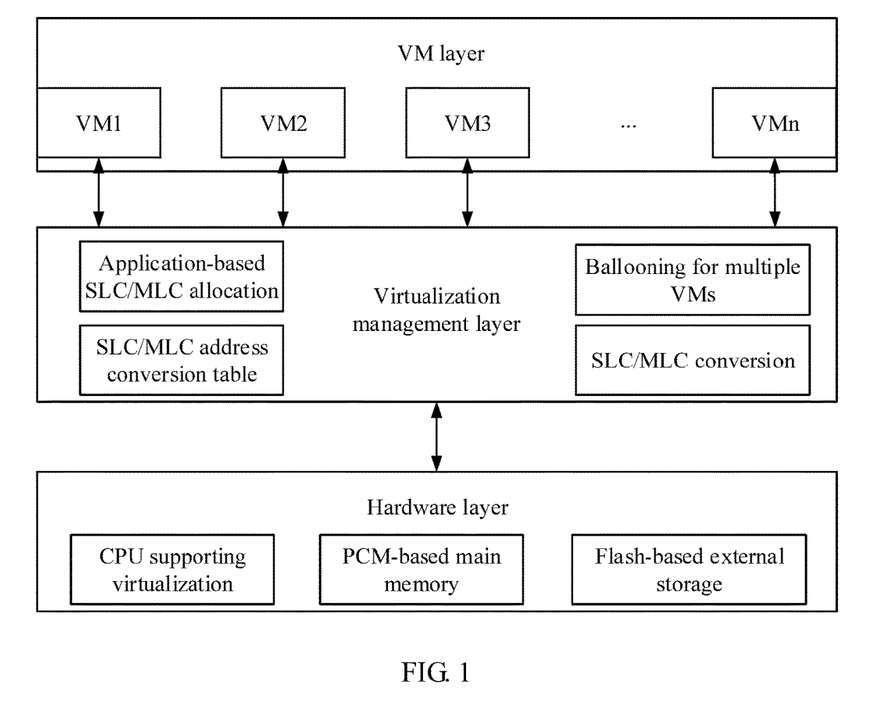
FIG. 1 is a schematic diagram of an application environment of embodiments of the present disclosure.

As shown in FIG. 1, an application scenario of the embodiments of the present disclosure mainly includes a hardware layer, a virtualization management layer, and a VM layer. The hardware layer includes hardware devices such as a central processing unit (CPU) supporting virtualization, a PCM-based main memory, and a flash-based external storage. The VM layer is responsible for running a mobile operating system. The virtualization management layer is mainly responsible for coordination work such as virtual memory scheduling, Input/Output (I/O) request scheduling, and CPU task scheduling. The embodiments of the present disclosure improve a memory scheduling algorithm in the virtualization management layer. In the memory scheduling, allocation of an SLC memory page and an MLC memory page is adjusted according to activity statuses of memory pages, and an idle memory page and an active memory page are allocated to be an SLC storage manner. When a quantity of idle SLC memory pages in a VM is less than a specified threshold, conversion between the SLC memory page and the MLC memory page is started, and data in an inactive SLC memory page is converted to data in an MLC memory page for storage in order to save an idle SLC memory page for storage of new data. As shown in FIG. 1, in the embodiments of the present disclosure, the virtualization management layer (for e.g., a Hypervisor) is added with functions of an application-based SLC/MLC allocator (for e.g., an ASPA Page Allocator), an SLC/MLC address conversion table (when conversion is performed between an SLC and an MLC, because physical address space is changed, the SLC/MLC address conversion table is needed to record a conversion relationship), ballooning for multiple VMs, and SLC/MLC conversion (see detailed descriptions in the following Embodiments 1 and 2).

The embodiments of the present disclosure will be further explained in detail with reference to the accompanying drawings.

Embodiment 1

In the embodiment, a memory page in memory includes an idle SLC memory page, an active SLC memory page, an inactive SLC memory page, and an MLC memory page, and the idle SLC memory page has no data, data stored in the active SLC memory page is data accessed within a specified time period, and data stored in the inactive SLC memory page and the MLC memory page is data not accessed within the specified time period.

The specified time period herein is determined based on memory utilization (including memory access frequency and memory usage). A higher memory access frequency or higher memory usage indicates a shorter specified time period, or a higher memory access frequency and higher memory usage indicate a shorter specified time period.

For the foregoing different types of memory pages, in specific implementation, conversion may be performed in real time between different types of memory pages based on a memory page access situation. A specific process includes allocating an idle SLC memory page for a memory allocation request after the memory allocation request is received, and re-identifying the idle SLC memory page as an active SLC memory page, re-identifying an inactive SLC memory page as an active SLC memory page after an access request for the inactive SLC memory page is received, and re-identifying the active SLC memory page as an inactive SLC memory page for an active SLC memory page, if no access request for the memory page is received within the specified time period. In specific implementation, a memory page linked list may be used to store addresses of different types of memory pages (see detailed descriptions in subsequent Embodiment 2).

Figure 2:
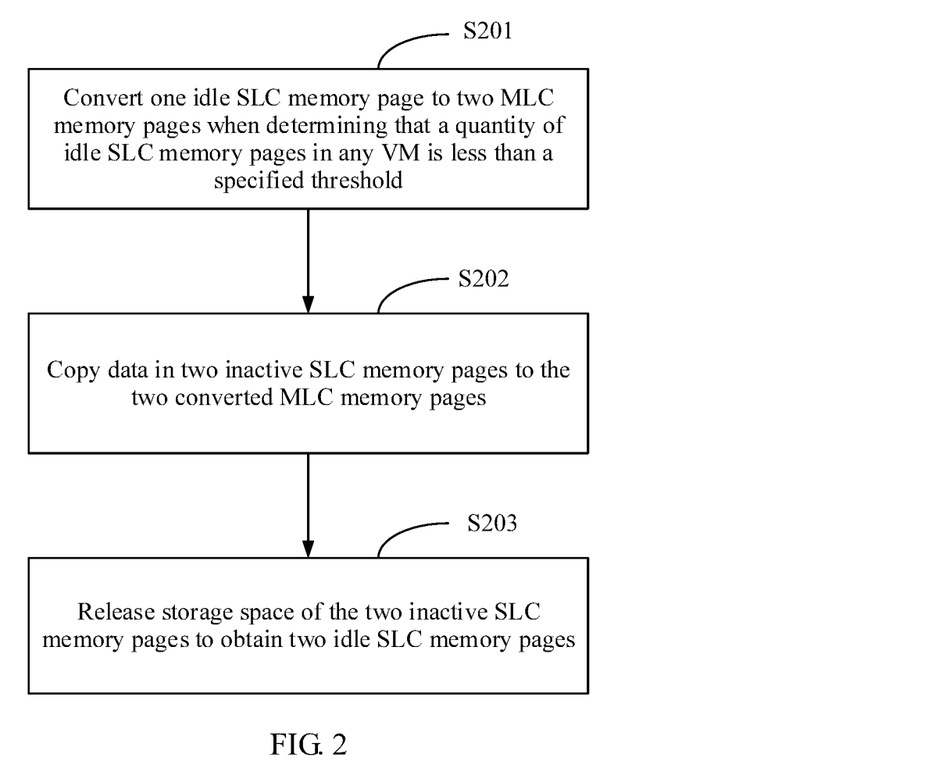
FIG. 2 is a flowchart of a method for processing a memory page in memory provided in Embodiment 1 of the present disclosure.

On the basis hereof, a process procedure shown in FIG. 2 may be executed, and includes the following steps.

Step S201: Convert one idle SLC memory page to two MLC memory pages when determining that a quantity of idle SLC memory pages in any VM is less than a specified threshold.

Herein, the specified threshold is determined based on a page fault probability and access performance. A smaller specified threshold indicates a higher probability of generating a page fault and higher memory access performance (because of a relatively small quantity of converted MLC memory pages). When the specified threshold is larger, the probability of generating a page fault is lower and the memory access performance is lower (because of a relatively large quantity of converted MLC memory pages). However, the page fault probability is not increased linearly with an increase of the specified threshold. Accordingly, the access performance is not decreased linearly with the increase of the specified threshold. Therefore, a value that makes a page fault probability low and access performance relatively high may be obtained using experimental tests in specific implementation.

In a specific implementation, a given amount of memory is applied for each VM. After data is written to an idle SLC memory page in the memory, the memory page becomes an active SLC memory page which may be frequently accessed (read or written) and then enters progressively into an inactive period, and is almost hardly accessed, that is, becomes an inactive SLC memory page. In this embodiment of the present disclosure, idle SLC memory pages are constantly consumed for storing new data, and that memory resources are not released in a timely manner when VMs are busy with service may result in increasingly fewer SLC memory pages. When it is monitored that a quantity of idle SLC memory pages is less than the specified threshold, conversion between an idle SLC memory page and an MLC memory page is started.

Step S202: Copy data in two inactive SLC memory pages to the two converted MLC memory pages.

Step S203: Release storage space of the two inactive SLC memory pages to obtain two idle SLC memory pages.

Figure 3:
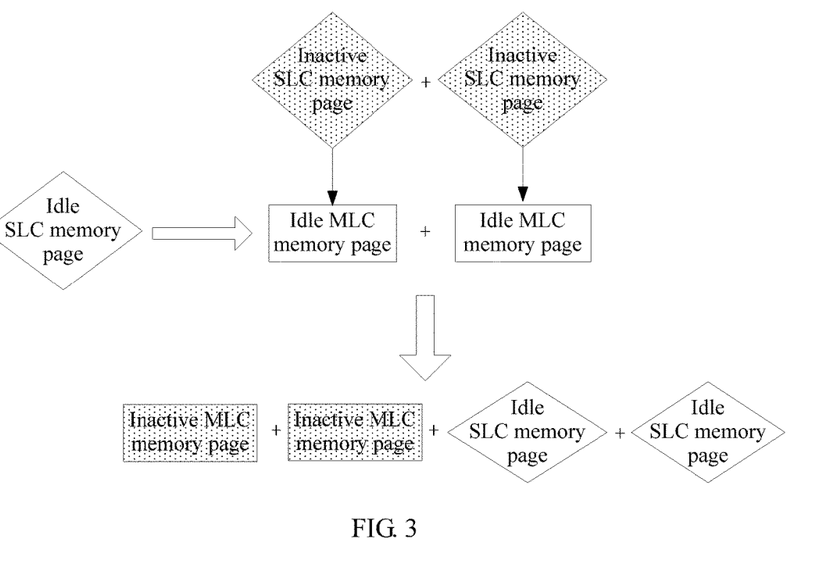
FIG. 3 is a schematic diagram of conversion between an SLC and an MLC performed in Embodiment 1 of the present disclosure.

Referring to FIG. 3, FIG. 3 is a schematic diagram of conversion between an SLC and an MLC performed in Embodiment 1 of the present disclosure. Firstly, as described in step S201, one idle SLC memory page is converted to two MLC memory pages (idle MLC memory pages at this moment). That is, each idle SLC memory page may be converted to two MLC memory pages (which is determined by physical properties of the SLC and the MLC), and storage space doubles.

Then, as described in step S202, data in two inactive SLC memory pages is copied to the two converted MLC memory pages (the idle MLC memory pages become inactive MLC memory pages at this moment). Herein, for either the SLC memory page or the MLC memory page, an amount of data that can be stored in each memory page is the same. Therefore data in every two SLC memory pages also needs to occupy two MLC memory pages.

Lastly, as described in step S203, storage space of the two inactive SLC memory pages is released to be converted to two idle SLC memory pages. At the moment, the one idle SLC memory page initially converted to the two MLC memory pages is subtracted, that is, one idle SLC memory page is saved. The one idle SLC memory page may continue to be allocated for storing new data.

According to the foregoing Embodiment 1, an idle memory page to be accessed within a short time and an active memory page to be accessed frequently are planned to be in a high performance SLC storage mode to fully improve memory access performance. In addition, when a quantity of available idle SLC memory pages in a VM is less than a specified threshold, data in an inactive SLC memory page is converted to data in an MLC memory page for storage, idle memory space may further be saved, thereby improving a storage capacity and reducing page faults.

In a specific implementation, when a system works with a heavy load, especially working with overload, it may be impossible to find at least two inactive SLC memory pages, then data in two MLC memory pages may be directly written back to an external storage, and the two MLC memory pages are converted to one idle SLC memory page. Such conversion manner may lead to a page fault. However, data in the MLC memory pages is actually data in the inactive SLC and is not accessed frequently. This brings a relatively low extra overhead for the system. When the system workload is heavier and even an available MLC memory page cannot be found, it means that almost all memory pages are used in the SLC storage mode and are actively accessed. In this case, a super management program of a virtual platform may be started to balance memory allocation between different VMs. For detailed description, see the following Embodiment 2.

Embodiment 2

Figure 4:
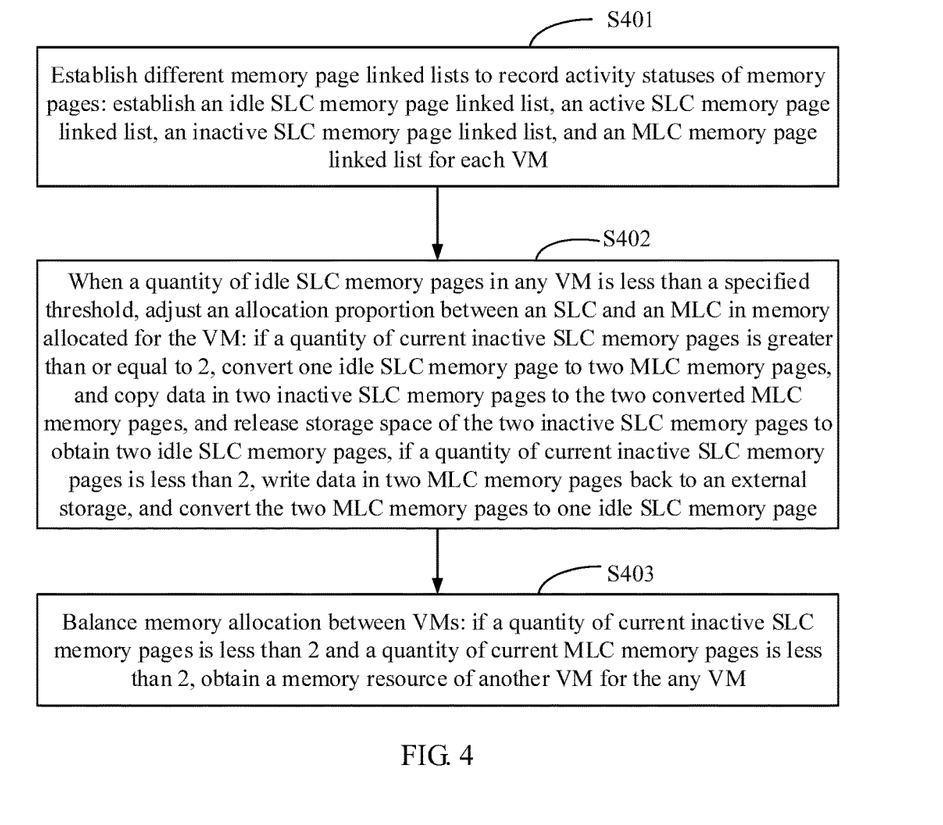
FIG. 4 is a flowchart of a method for processing a memory page in memory performed in Embodiment 2 of the present disclosure.

Referring to FIG. 4, FIG. 4 is a flowchart of a method for processing a memory page performed in Embodiment 2 of the present disclosure. The method includes the following steps.

Step S401: Establish different memory page linked lists to record activity statuses of memory pages: establish an idle SLC memory page linked list, an active SLC memory page linked list, an inactive SLC memory page linked list, and an MLC memory page linked list for each VM.

Herein, the idle SLC memory page linked list is used to store addresses of idle SLC memory pages, the active SLC memory page linked list is used to store addresses of active memory pages, the inactive SLC memory page linked list is used to store addresses of inactive memory pages, and the MLC memory page linked list is used to store addresses of MLC memory pages. Activity statuses of memory pages are recorded using these memory page linked lists.

In a specific implementation, the idle SLC memory page is a memory page that has no storage data, the active SLC memory page is used to store data frequently accessed recently, and the inactive SLC memory page and the MLC memory pages are used to store data not accessed within a specified time period. After a memory allocation request is received, an idle SLC memory page is allocated for the memory allocation request, and an address of the idle SLC memory page is transferred from the established idle SLC memory page linked list to the established active SLC memory page linked list. After an access request for an inactive SLC memory page is received, an address of the inactive SLC memory page is transferred from the established inactive SLC memory page linked list to the established active SLC memory page linked list. For the active SLC memory page, if no access request for the memory page is received within the specified time period, an address of the active SLC memory page is transferred from the established active SLC memory page linked list to the established inactive SLC memory page linked list.

Step S402: When a quantity of idle SLC memory pages in any VM is less than a specified threshold, adjust an allocation proportion between an SLC and an MLC in memory allocated to the VM: if a quantity of current inactive SLC memory pages is greater than or equal to 2, convert one idle SLC memory page to two MLC memory pages, and copy data in two inactive SLC memory pages to the two converted MLC memory pages, and release storage space of the two inactive SLC memory pages to obtain two idle SLC memory pages, if a quantity of current inactive SLC memory pages is less than 2, write data in two MLC memory pages back to an external storage, and convert the two MLC memory pages to one idle SLC memory page.

Step S403: Balance memory allocation between VMs: if a quantity of current inactive SLC memory pages is less than 2 and a quantity of current MLC memory pages is less than 2, obtain a memory resource of another VM for the any VM.

On a mobile virtualization platform, VMs running different applications have different memory requests based on requirements of different applications. When memory pages in a VM are almost in an active state, there is a large quantity of idle memory pages in another VM. By invoking a super management program of the virtual platform, part of memory is retrieved from the VM with a large quantity of idle memory pages (for example, the quantity of idle memory pages is greater than a preset value) and then is allocated to the VM with fewer idle memory pages currently.

Figure 5:
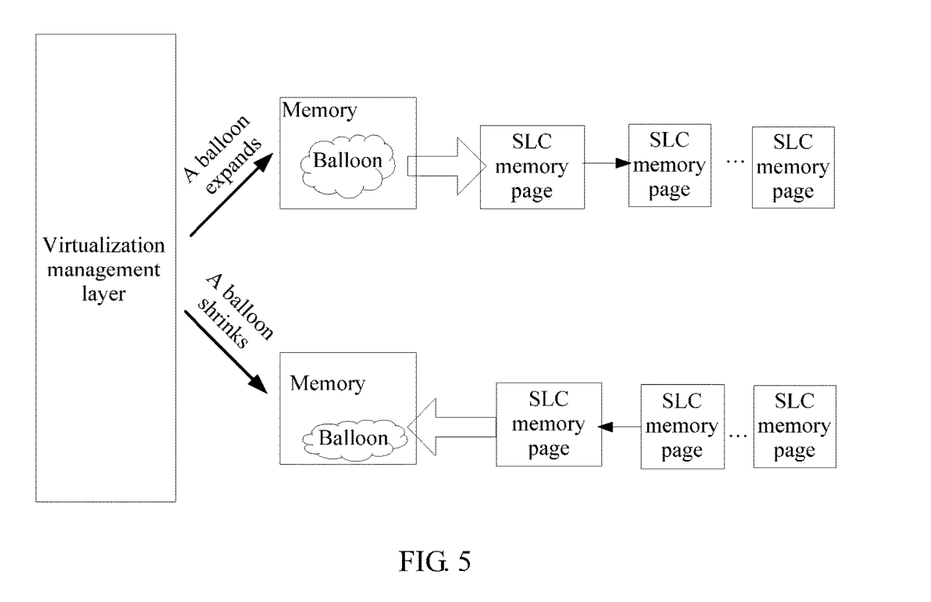
FIG. 5 is a schematic diagram of using a balloon technique to balance memory allocation between VMs.

As shown in FIG. 5, a balloon technique is used to balance memory allocation between VMs. When memory allocated to a VM is retrieved by a super management program, a balloon drive program of the VM is expanded, and an idle SLC memory page may be released using a balloon drive and is allocated to a VM with insufficient memory.

Based on the foregoing descriptions, the solution of the present disclosure has the following advantageous effects.

1) A high performance characteristic of an SLC is fully utilized, reducing a memory access delay. In this embodiment of the present disclosure, high-performance SLC memory is allocated for a new memory page request and a memory page written frequently, thereby improving access performance.

2) A large capacity characteristic of an MLC is fully utilized, expanding a memory capacity and reducing page faults. In this embodiment of the present disclosure, an inactive SLC memory page is converted to large-capacity MLC pages in a case of memory is insufficient, thereby increasing a memory capacity and reducing page faults.

3) System overall performance is improved. The overall performance of a system depends on three factors, a quantity of SLC access times, a quantity of MLC access times, and a quantity of page fault times. In this embodiment of the present disclosure, memory pages accessed frequently are planned to be low-delay SLC memory pages, and memory pages accessed less frequently are planned to be large-capacity MLC memory pages, thereby reducing a memory page access delay on the one hand and expanding a memory capacity, reducing page faults, and improving the overall performance of the system on the other hand.

4) Overall performance of multiple VMs is improved. In this embodiment of the present disclosure, when available idle memory of a VM is insufficient, the super management program is invoked to retrieve an idle memory page in another VM and allocate the idle memory page to the VM with insufficient memory, thereby improving the overall performance of the multiple VMs.

5) Storage and performance overheads are low. A system overhead in this embodiment of the present disclosure mainly includes a space overhead on an SLC/MLC address conversion table and a run-time overhead during an SLC/MLC conversion process, and these overheads are small, a statistical result indicates that the address conversion table occupies only memory about 0.2 percent (%), the SLC/MLC conversion process involves only a memory-to-memory operation, and the system overhead is very small.

According to a same inventive concept, an embodiment of the present disclosure further provides an apparatus for processing a memory page in memory corresponding to the method for processing a memory page in memory. A principle of the apparatus to solve a problem is the same as that of the method for processing a memory page in memory in the embodiment of the present disclosure, and for implementation of the apparatus, reference may be made to implementation of the method, and to avoid repetition, details may not be described herein.

Figure 6:
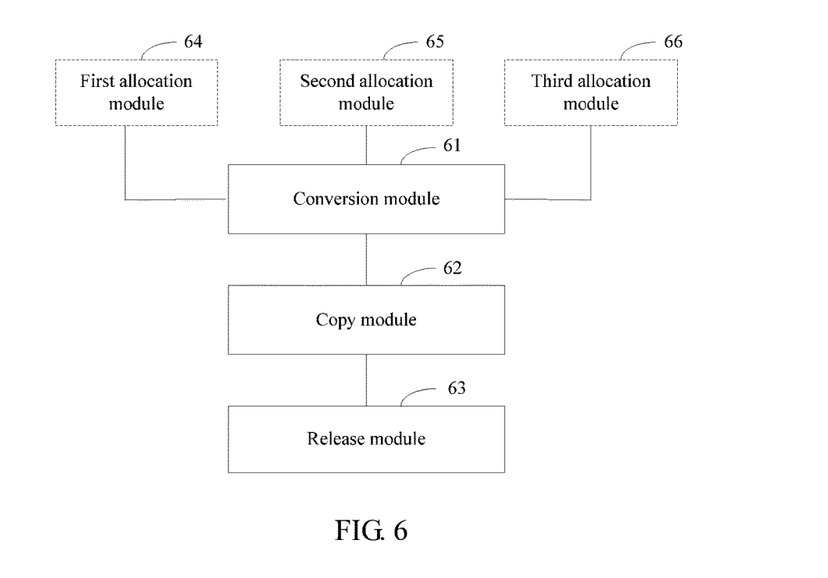
FIG. 6 is a schematic structural diagram of an apparatus for processing a memory page in memory provided in an embodiment of the present disclosure.

Referring to FIG. 6, FIG. 6 is a schematic structural diagram of an apparatus for processing a memory page in memory provided in an embodiment of the present disclosure. A memory page in memory includes an idle SLC memory page, an active SLC memory page, an inactive SLC memory page, and an MLC memory page. The idle SLC memory page has no data, data stored in the active SLC memory page is data accessed within a specified time period, and data stored in the inactive SLC memory page and the MLC memory page is data not accessed within the specified time period. The apparatus includes a conversion module 61 configured to convert one idle SLC memory page to two MLC memory pages when determining that a quantity of idle SLC memory pages in any VM is less than a specified threshold, a copy module 62 configured to copy data in two inactive SLC memory pages to the two converted MLC memory pages, and a release module 63 configured to release storage space of the two inactive SLC memory pages to obtain two idle SLC memory pages.

Optionally, a higher memory access frequency or higher memory usage indicates a shorter specified time period, or a higher memory access frequency and higher memory usage indicate a shorter specified time period.

Optionally, a smaller specified threshold indicates higher memory access performance and a higher probability of generating a page fault.

Optionally, after determining that a quantity of idle SLC memory pages in any VM is less than the specified threshold, if a quantity of current inactive SLC memory pages is less than 2, the conversion module 61 is further configured to write data in the two MLC memory pages back to an external storage, and convert the two MLC memory pages to one idle SLC memory page.

Optionally, after determining that a quantity of idle SLC memory pages in any VM is less than the specified threshold, if a quantity of current inactive SLC memory pages is less than 2 and a quantity of current MLC memory pages is less than 2, the conversion module 61 is further configured to obtain an idle memory page of another VM for the any VM.

Optionally, the apparatus further includes a first allocation module 64 configured to allocate an idle SLC memory page for a memory allocation request after the memory allocation request is received, and re-identify the idle SLC memory page as an active SLC memory page.

Optionally, the first allocation module 64 is further configured to transfer an address of the idle SLC memory page from an established idle SLC memory page linked list to an established active SLC memory page linked list.

Optionally, the apparatus further includes a second allocation module 65 configured to re-identify an inactive SLC memory page as an active SLC memory page after an access request for the inactive SLC memory page is received.

Optionally, the second allocation module 65 is further configured to transfer an address of the inactive SLC memory page from an established inactive SLC memory page linked list to the established active SLC memory page linked list.

Optionally, the apparatus further includes a third allocation module 66 configured to re-identify the active SLC memory page as an inactive SLC memory page, for an active SLC memory page, if no access request for the memory page is received within the specified time period.

Optionally, the third allocation module 66 is further configured to transfer an address of the active SLC memory page from the established active SLC memory page linked list to an established inactive SLC memory page linked list.

Figure 7:
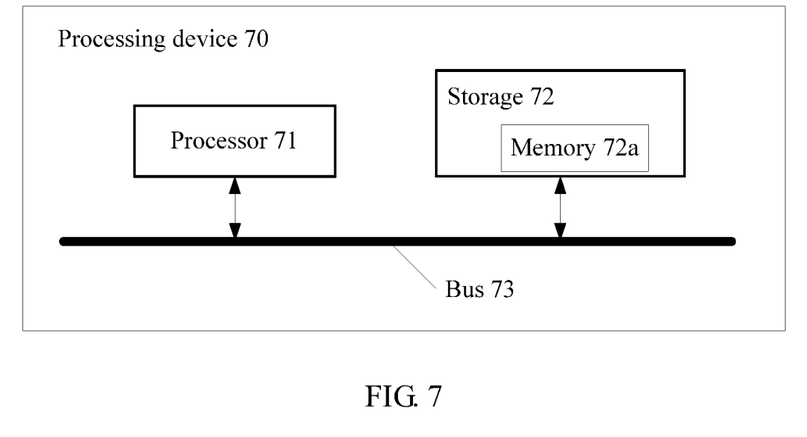
FIG. 7 is a schematic structural diagram of a processing device for processing a memory page in memory provided in an embodiment of the present disclosure.

Referring to FIG. 7, FIG. 7 is a schematic structural diagram of a processing device 70 for processing a memory page in memory provided in an embodiment of the present disclosure. The processing device 70 includes a processor 71, a storage 72, and a bus 73. The storage 72 includes memory 72*a*, a memory page in the memory 72*a* includes an idle SLC memory page, an active SLC memory page, an inactive SLC memory page, and an MLC memory page. The idle SLC memory page has no data, data stored in the active SLC memory page is data accessed within a specified time period, and data stored in the inactive SLC memory page and the MLC memory page is data not accessed within the specified time period. The storage 72 stores execution instructions, and when the processing device 70 is running, the processor 71 communicates with the storage 72 using the bus 73 such that the processor 71 performs the execution instructions of converting one idle SLC memory page to two MLC memory pages when determining that a quantity of idle SLC memory pages in any VM is less than a specified threshold, copying data in two inactive SLC memory pages to the two converted MLC memory pages, and releasing storage space of the two inactive SLC memory pages to obtain two idle SLC memory pages.

Optionally, a higher memory access frequency or higher memory usage indicates a shorter specified time period, or a higher memory access frequency and higher memory usage indicate a shorter specified time period.

Optionally, a smaller specified threshold indicates higher memory access performance and a higher probability of generating a page fault.

Optionally, after determining that a quantity of idle SLC memory pages in any VM is less than a specified threshold, if a quantity of current inactive SLC memory pages is less than 2, the execution instructions performed by the processor 71 further include writing data in the two MLC memory pages back to an external storage, and converting the two MLC memory pages to one idle SLC memory page, where M is a positive integer.

Optionally, after determining that a quantity of idle SLC memory pages in any VM is less than a specified threshold, if a quantity of current inactive SLC memory pages is less than 2 and a quantity of current MLC memory pages is less than 2, the execution instructions performed by the processor 71 further include obtaining a memory resource of another VM for the any VM.

Optionally, the execution instructions performed by the processor 71 further include allocating an idle SLC memory page for a memory allocation request after the memory allocation request is received, and re-identifying the idle SLC memory page as an active SLC memory page.

Optionally, when re-identifying the idle SLC memory page as an active SLC memory page, the execution instructions performed by the processor 71 includes transferring an address of the idle SLC memory page from an established idle SLC memory page linked list to an established active SLC memory page linked list.

Optionally, the execution instructions performed by the processor 71 further include re-identifying an inactive SLC memory page as an active SLC memory page after an access request for the inactive SLC memory page is received.

Optionally, when re-identifying an inactive SLC memory page as an active SLC memory page, the execution instructions performed by the processor 71 includes transferring an address of the inactive SLC memory page from an established inactive SLC memory page linked list to the established active SLC memory page linked list.

Optionally, for an active SLC memory page, if no access request for the memory page is received within the specified time period, the execution instructions performed by the processor 71 further include re-identifying the active SLC memory page as an inactive SLC memory page.

Optionally, when re-identifying the active SLC memory page as an inactive SLC memory page, the execution instructions performed by the processor 71 includes transferring an address of the active SLC memory page from the established active SLC memory page linked list to an established inactive SLC memory page linked list.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, compact disc read-only memory (CD-ROM), an optical memory, and the like) that include computer-usable program code.

The present disclosure is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for processing a memory page in memory, wherein the memory page in the memory comprises an idle single-level cell (SLC) memory page, an active SLC memory page, an inactive SLC memory page, and a multi-level cell (MLC) memory page, wherein the idle SLC memory page has no data, wherein data stored in the active SLC memory page is data accessed within a specified time period, wherein data stored in the inactive SLC memory page and the MLC memory page is data not accessed within the specified time period, and wherein the processing method comprises:
    converting one idle SLC memory page to two MLC memory pages when a quantity of idle SLC memory pages in any virtual machine (VM) is less than a specified threshold;
    copying data in two inactive SLC memory pages to the two converted MLC memory pages; and
    releasing storage space of the two inactive SLC memory pages to obtain two idle SLC memory pages.

2. The method according to claim 1, wherein a higher memory access frequency or higher memory usage indicates a shorter specified time period, or wherein the higher memory access frequency and the higher memory usage indicate the shorter specified time period.

3. The method according to claim 1, wherein a smaller specified threshold indicates higher memory access performance and a higher probability of generating a page fault.

4. The method according to claim 1, wherein after determining that the quantity of idle SLC memory pages in the any VM is less than the specified threshold and when a quantity of current inactive SLC memory pages is less than 2, the method further comprises:
    writing the data in the two MLC memory pages back to an external storage; and
    converting the two MLC memory pages to one idle SLC memory page.

5. The method according to claim 4, wherein after determining that the quantity of idle SLC memory pages in the any VM is less than the specified threshold, the method further comprises obtaining an idle memory page of another VM for the any VM when the quantity of current inactive SLC memory pages is less than 2 and a quantity of current MLC memory pages is less than 2.

6. The method according to claim 1, further comprising:
    allocating an idle SLC memory page for a memory allocation request after the memory allocation request is received; and
    re-identifying the idle SLC memory page as an active SLC memory page.

7. The method according to claim 6, wherein re-identifying the idle SLC memory page as the active SLC memory page comprises transferring an address of the idle SLC memory page from an established idle SLC memory page linked list to an established active SLC memory page linked list.

8. The method according to claim 1, further comprising re-identifying an inactive SLC memory page as an active SLC memory page after an access request for the inactive SLC memory page is received.

9. The method according to claim 8, wherein re-identifying the inactive SLC memory page as the active SLC memory page comprises transferring an address of the inactive SLC memory page from an established inactive SLC memory page linked list to an established active SLC memory page linked list.

10. The method according to claim 1, further comprising re-identifying an active SLC memory page as an inactive SLC memory page when no access request for the active SLC memory page is received within the specified time period.

11. The method according to claim 10, wherein re-identifying the active SLC memory page as the inactive SLC memory page comprises transferring an address of the active SLC memory page from an established active SLC memory page linked list to an established inactive SLC memory page linked list.

12. An apparatus for processing a memory page in memory, wherein the memory page in the memory comprises an idle single-level cell (SLC) memory page, an active SLC memory page, an inactive SLC memory page, and a multi-level cell (MLC) memory page, wherein the idle SLC memory page has no data, wherein data stored in the active SLC memory page is data accessed within a specified time period, wherein data stored in the inactive SLC memory page and the MLC memory page is data not accessed within the specified time period, and wherein the apparatus comprises:
   a storage comprising instructions; and
   a processor coupled to the storage, wherein the instructions cause the processor to be configured to:
      convert one idle SLC memory page to two MLC memory pages when a quantity of idle SLC memory pages in any virtual machine (VM) is less than a specified threshold;
      copy data in two inactive SLC memory pages to the two converted MLC memory pages; and
      release storage space of the two inactive SLC memory pages to obtain two idle SLC memory pages.

13. The apparatus according to claim 12, wherein a higher memory access frequency or higher memory usage indicates a shorter specified time period, or wherein the higher memory access frequency and the higher memory usage indicate the shorter specified time period.

14. The apparatus according to claim 12, wherein a smaller specified threshold indicates higher memory access performance and a higher probability of generating a page fault.

15. The apparatus according to claim 14, wherein after determining that the quantity of idle SLC memory pages in the any VM is less than the specified threshold, and when a quantity of current inactive SLC memory pages is less than 2, the instructions further cause the processor to be configured to:
   write the data in the two MLC memory pages back to an external storage; and
   convert the two MLC memory pages to one idle SLC memory page.

16. The apparatus according to claim 15, wherein after determining the quantity of idle SLC memory pages in the any VM is less than the specified threshold, and when the quantity of current inactive SLC memory pages is less than 2 and a quantity of current MLC memory pages is less than 2, the instructions further cause the processor to be configured to obtain an idle memory page of another VM for the any VM.

17. The apparatus according to claim 12, wherein the instructions further cause the processor to be configured to:
   allocate an idle SLC memory page for a memory allocation request after the memory allocation request is received; and
   re-identify the idle SLC memory page as an active SLC memory page.

18. The apparatus according to claim 17, wherein the instructions further cause the processor to be configured to transfer an address of the idle SLC memory page from an established idle SLC memory page linked list to an established active SLC memory page linked list.

19. The apparatus according to claim 12, wherein the instructions further cause the processor to be configured to re-identify an inactive SLC memory page as an active SLC memory page after an access request for the inactive SLC memory page is received.

20. The apparatus according to claim 19, wherein the instructions further cause the processor to be configured to transfer an address of the inactive SLC memory page from an established inactive SLC memory page linked list to an established active SLC memory page linked list.

21. The apparatus according to claim 12, wherein when no access request for an active SLC memory page is received within the specified time period, the instructions further cause the processor to be configured to re-identify the active SLC memory page as an inactive SLC memory page.

22. The apparatus according to claim 21, wherein the instructions further cause the processor to be configured to transfer an address of the active SLC memory page from an established active SLC memory page linked list to an established inactive SLC memory page linked list.

* * * * *